United States Patent [19]
Sakagami et al.

[11] Patent Number: 5,497,194
[45] Date of Patent: Mar. 5, 1996

[54] ELECTRONIC CAMERA FOR PHOTOGRAPHING AND RECORDING AN IMAGE AND FOR RECORDING AND REPRODUCING A VOICE

[75] Inventors: Koubun Sakagami, Yokohama; Eiichi Maeda, Kawasaki; Masafumi Tanaka, Osaka, all of Japan

[73] Assignee: Ricoh Company, Ltd., Tokyo, Japan

[21] Appl. No.: 819,066

[22] Filed: Jan. 10, 1992

Related U.S. Application Data

[63] Continuation-in-part of Ser. No. 639,094, Jan. 9, 1991, abandoned.

[30] Foreign Application Priority Data

Jan. 11, 1990 [JP] Japan ............................. 2-4298

[51] Int. Cl.$^6$ ................. H04N 5/335; H04N 5/92
[52] U.S. Cl. ................. 348/222; 348/232; 360/35.1; 358/335
[58] Field of Search ........................ 358/198, 909, 358/209, 335, 310, 341–343; 360/19.1, 35.1; H04N 5/335, 5/92

[56] References Cited

U.S. PATENT DOCUMENTS

| | | | |
|---|---|---|---|
| 2,266,194 | 12/1941 | Guanella | 358/198 |
| 4,490,753 | 12/1984 | Ito et al. | 360/191.1 |
| 4,531,161 | 7/1985 | Murakoshi | 358/909 |
| 4,792,866 | 12/1988 | Hirobe et al. | 360/19.1 |
| 4,873,580 | 10/1989 | Katoh et al. | 358/906 |
| 4,931,878 | 6/1990 | Takei et al. | 358/909 |
| 5,016,107 | 5/1991 | Sasson et al. | 358/909 |
| 5,018,186 | 5/1991 | Kimura et al. | 360/35.1 |
| 5,032,927 | 7/1991 | Watanabe et al. | 358/909 |
| 5,111,304 | 5/1992 | Kinoshita et al. | 358/341 |
| 5,153,730 | 10/1992 | Nagasaki et al. | 358/909 |

FOREIGN PATENT DOCUMENTS 62-269581  11/1987  Japan ............................. H04N 5/335

Primary Examiner—James J. Groody
Assistant Examiner—Glenton B. Burgess
Attorney, Agent, or Firm—Oblon, Spivak, McClelland, Maier & Neustadt

[57] ABSTRACT

An electronic camera includes an image converting device, a voice converting device, an image data compressing and expanding device, a voice data compressing and expanding device, a single digital/analog converter, a sample-holding device for sample-holding and outputting the analog sound signals, a pedestal level generating device for generating signals indicative of pedestal levels, a change-over switching device for connecting the voice data compressing and expanding device to the sample-holding means when causing the pedestal level generating device to output the signals indicative of pedestal levels and for connecting the image data compressing and expanding device to the single digital/analog converter when causing the pedestal level generating device to prevent the outputting of the signals indicative of the pedestal level.

5 Claims, 4 Drawing Sheets

ELECTRONIC CAMERA FOR PHOTOGRAPHING AND RECORDING AN IMAGE AND FOR RECORDING AND REPRODUCING A VOICE

CROSS-REFERENCE TO RELATED APPLICATION

The present application is a continuation-in-part of application Ser. No. 639,094 filed on Jan. 9, 1991, which is abandoned.

BACKGROUND OF THE INVENTION

1. Field of the Invention

The invention relates to an electronic camera for photographing and recording an image and for recording and reproducing a voice.

2. Description of the Related Art

In a general electronic camera, an image is photographed and recorded, but no image is reproduced and no voice is recorded and reproduced. Such an electronic camera is shown in Japan Patent Laying Open (KOKAI) No. 62-269581, etc. In this laid-open Japanese application, a still picture is photographed and recorded to a memory in an electronic still camera.

In the above electronic camera, since no voice is recorded, it is impossible to record preliminary information corresponding to the picture such as a photographing situation of the image, an explanation of the image, a message, etc. Further, it is very convenient to input and record additional information in relation to the information of the photographed still picture to the memory. Such additional information is considered to be recorded as character data. When such additional information is recorded to the memory as character data, it is necessary to input the character data by a keying operation. However, it is troublesome for an operator to perform such a keying operation.

SUMMARY OF THE INVENTION

It is therefore an object of the present invention to provide an electronic camera for photographing and recording an image and for recording and reproducing a voice without the above mentioned defects.

The above object of the present invention can be achieved by an electronic camera for photographing and recording an image and for recording and reproducing a voice, comprising: an image converting means for converting image data on photographed images to digital image signals and for outputting the digital image signals; a voice converting means for converting voices inputted thereto to digital sound signals and for outputting the digital sound signals; an image data compressing and expanding means for compressing and storing the digital image signals supplied from the image converting means and for expanding and outputting the digital image signals stored therein; a voice data compressing and expanding means for compressing and storing the digital voice signals supplied from the voice converting means and for expanding and outputting the digital voice signals stored therein; a single digital/analog converter for converting the digital image signals to analog image signals and converting the digital sound signals to analog sound signals; a sample-holding means for sample-holding the analog sound signals supplied from the single digital/analog converter and for outputting the sample-held analog sound signals; a pedestal level generating means for generating signals indicative of pedestal levels on the analog image signals; a change-over switching means for connecting the voice data compressing and expanding means to the sample-holding means through the single digital/analog converter in order to supply the analog sound signals to the sample-holding means when causing the pedestal level generating means to output the signals indicative of pedestal levels and for connecting the image data compressing and expanding means to the single digital/analog converter in order to cause the single digital/analog converter to output the analog image signals when the pedestal level generating means is prevented from outputting of the signals indicative of the pedestal level.

Since a change-over switching means is provided for connecting the voice data compressing and expanding means to the sample-holding means through the single digital/analog converter in order to supply the analog sound signals to the sample-holding means when causing the pedestal level generating means to output the signals indicative of pedestal levels and for connecting the image data compressing and expanding means to the single digital/analog converter in order to cause the single digital/analog converter to output the analog image signals when causing the pedestal level generating means to prevent the outputting of the signals indicative of the pedestal level, it is possible to easily input and record preliminary information corresponding to a picture image such as a photographing situation of the image, an explanation of the image, a message, etc. Further, it is also possible to easily input and record additional information in relation to the photographed image. Therefore, it is very convenient for use in an electronic camera.

In the above electronic camera, since only a single digital/analog converter converts the digital image signals to the analog image signals and the digital sound signals to the analog sound signals, the cost of the electronic camera can be reduced and the camera can be made compact.

Further objects and advantages of the present invention will be apparent from the following description of the present invention as illustrated in the accompanying drawings.

DESCRIPTION OF THE PREFERRED EMBODIMENT

The preferred embodiments of the invention will next be described in detail with reference to the accompanying drawings.

Figure 1:
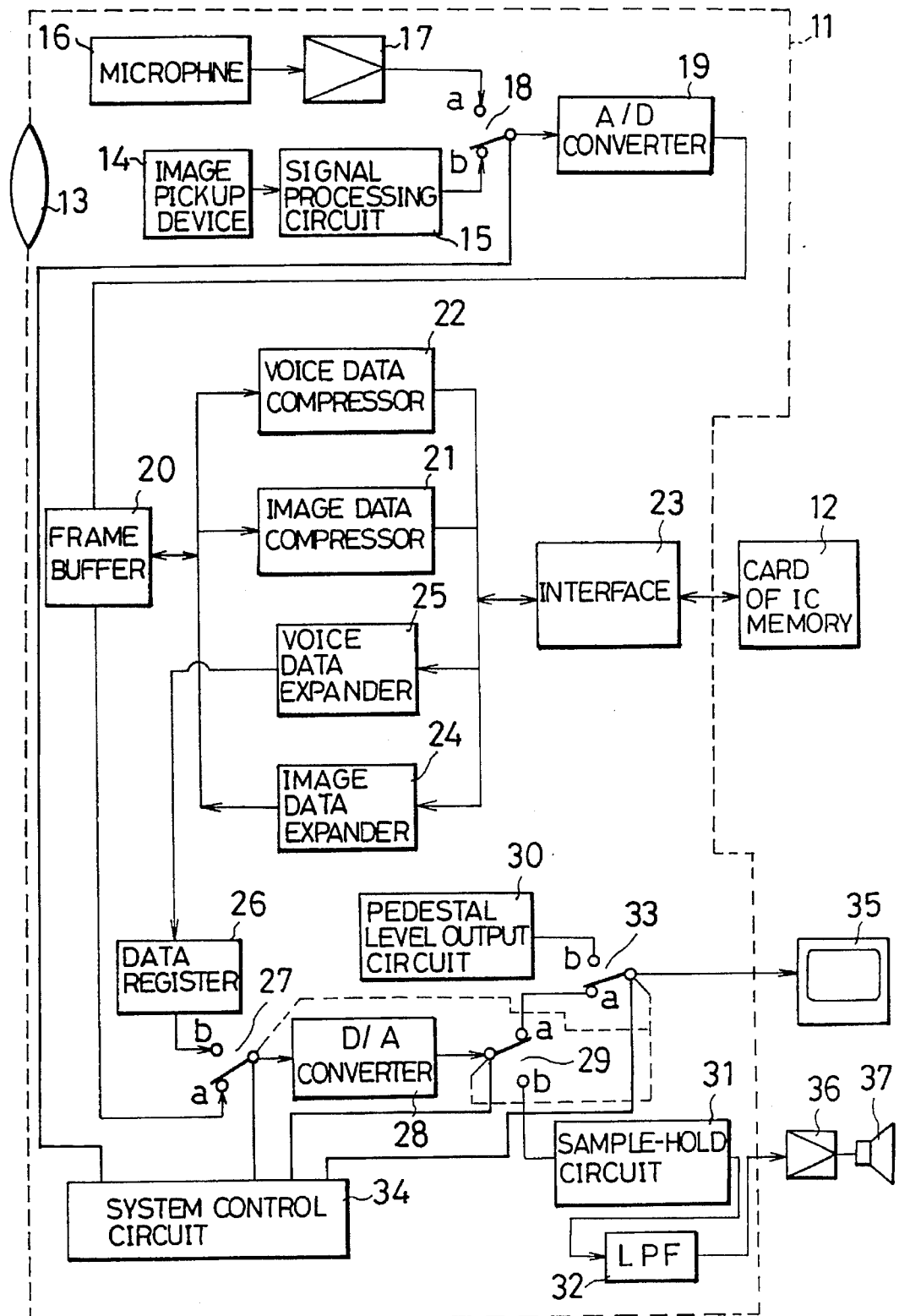
FIG. 1 is a block diagram showing an electronic camera in a first embodiment of the present invention.
Figure 2:
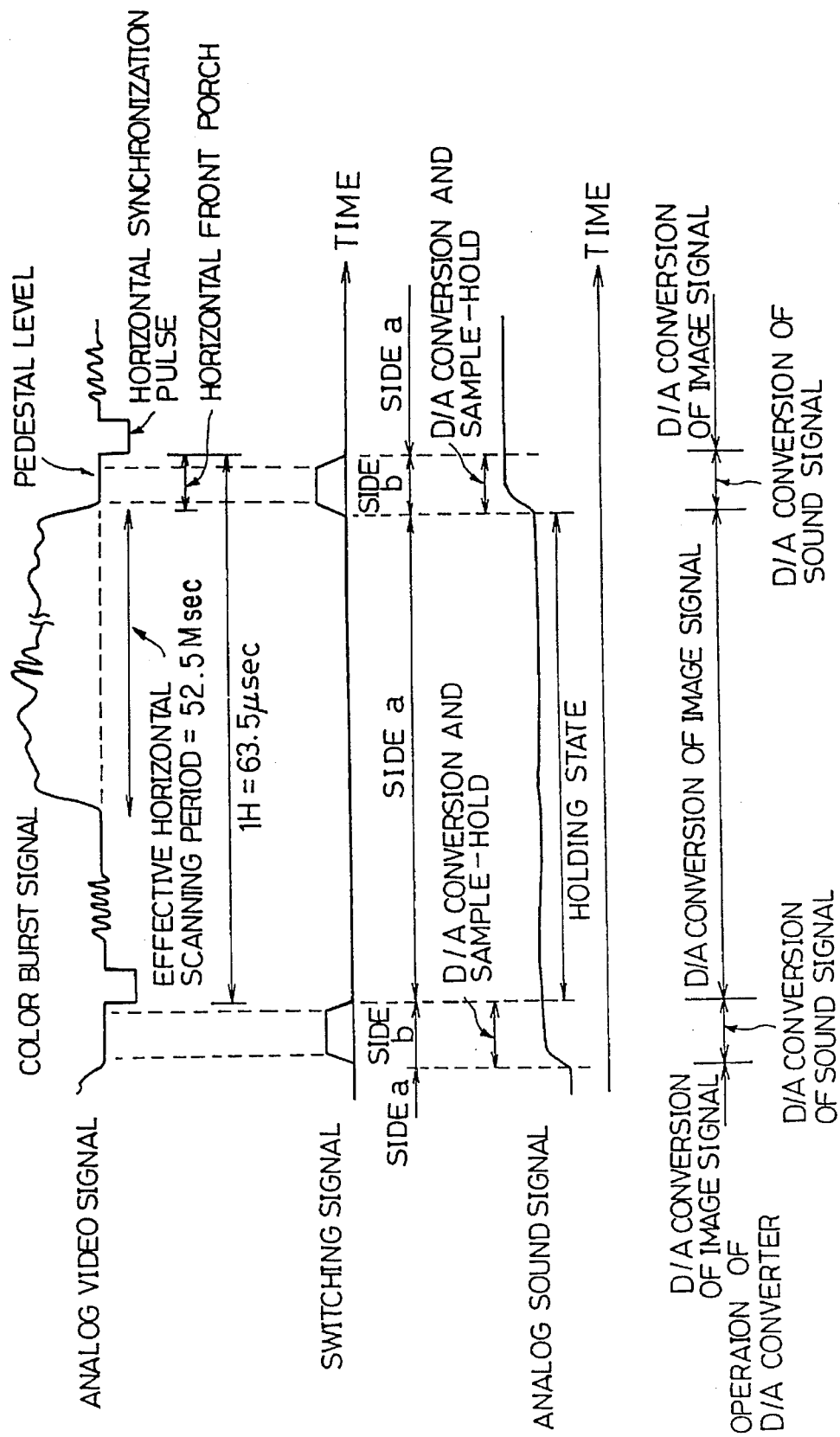
FIG. 2 is a timing chart of the electronic camera.

FIG. 1 is a block diagram showing an electronic camera in a first embodiment of the invention. FIG. 2 is a timing chart of the first embodiment.

In the first embodiment, an IC memory 12 of a card type is detachably attached to a camera body to photograph, record and reproduce a still picture and recorded and reproduce a voice. The camera body 11 has a lens 13 for focusing and forming the image of a photographed object, and an image pickup device 14 for photoelectrically converting the image of the photographed object of one picture formed by the lens 13 and outputting an analog image signal corresponding to the one picture. The camera body 11 also has a signal processing circuit 15 for converting the analog image signal provided from this image pickup device 14 to a general signal used as a standard television signal. This general signal is constructed by e.g., signals indicative of red, blue and green colors. Otherwise, this general signal is constructed by signals of luminance and chrominance, etc.

The camera body 11 further has a microphone 16 for inputting and converting the voice to an analog electric signal, and an amplifier 17 for amplifying the analog electric signal provided from this microphone 16. The camera body 11 further has a change-over switch 18 for switching a sound signal from amplifier 17 and an image signal from the signal processing circuit 15. The camera body 11 further has an analog/digital (A/D) converter 19 for converting the analog image signal or the sound signal from this change-over switch 18 to a digital signal. The camera body 11 further has a frame buffer 20 for storing the digital signal from the A/D converter 19, and an image data compressor 21 for compressing image data stored in this frame buffer 20. The camera body 11 further has a voice data compressor 22 for compressing voice data stored to the frame buffer 20.

The camera body 11 further has an interface 23 for inputting and outputting the compressed image data or the compressed voice data to the IC memory 12 of a card type. The camera body 11 further has an image data expander 24 and a voice data expander 25 for respectively expanding the compressed image data and voice data. The camera body 11 further has a data register 26 for temporarily holding the voice data expanded by the voice data expander 25, and a change-over switch 27 for switching the expander image data and voice data. The camera body 11 further has a digital/analog (D/A) converter 28 for converting the image or voice data from this change-over switch 27 to an analog signal. The camera body 11 further has a change-over switch 29 for switching analog image and voice data from this D/A converter 28.

The camera body 11 further has a pedestal level output circuit 30 for outputting a pedestal level of a viddeo signal. The camera body 11 further has a sample-hold circuit 31 for sample-holding an analog sound signal outputted from the D/A converter 28. The camera body 11 further has a low pass filter 32 and a change-over switch 33 for switching an analog image signal outputted from the D/A converter 28 and a signal indicative of the pedestal level from the pedestal level output circuit 30. The camera body 11 further has a system control circuit 34 for controlling entire sequential operations of the above constructional circuit elements.

When an image is recorded to the memory, the change-over switch 18 is switched onto the side of contact b. Thus a photographed object is photographed by image pickup device 14 through the lens 13. An analog image signal of one picture provided from this image pickup device 14 is recorded to the IC 12 of a card type through the signal processing circuit 15, the change-over switch 18, the A/D converter 19, the frame buffer 20, the image data compressor 21 and the interface 23.

When additional information in relation to the photographed image is to be input to the memory as a sound signal, the change-over switch 18 is switched onto the side of contact a. Thus, a voice in relation to the photographed image is inputted by an operator, to the camera through the microphone 6 and is converted to an analog electric signal. This analog electric signal is recorded to the IC memory 12 of a card type through the amplifier 17, the change-over switch 18, the A/D converter 19, the frame buffer 20, the voice data compressor 22 and the interface 23.

The operation of the electronic camera in the first embodiment to reproduce the voice and the image will next be described.

Compressed image data are read out of the IC memory 12 of a card type and are stored to the frame buffer 20 through the interface 23 and image data expander 24. Compressed voice data are also read out of the IC memory 12 of a card type and are stored to the data register 26 through the interface 23 and the voice data expander 25. The image data of the frame buffer 20 and the voice data of the data register 26 are respectively converted to analog image and sound signals by the D/A converter 28 through the change-over switch 27. At this time, it is necessary to continuously output the image signal repeatedly from the frame buffer 20. Further, it is necessary to output the sound signal from the data register 26 in real time. Accordingly, it is necessary to normally dispose two D/A converters for separately converting the image and sound signals to analog signals. However, in the first embodiment, the digital image and sound signals are converted to analog signals by the single D/A converter 28.

For example, the above analog image signal is an NTSC signal as shown in an upper portion of FIG. 2. An image display 35 is composed of a television monitor and the image signal is inputted to the image display 35 from the frame buffer 20 through the change-over switch 27, the D/A converter 28 and the change-over switches 29, 33 so that the image is displayed by the image display 35. An effective horizontal scanning period for the image display is set to 52.5μ seconds. A color burst signal and a horizontal synchronization signal are provided for other time periods in one horizontal scanning period (1H). A horizontal front porch of the image signal is set to have a period 1.5μ seconds. A voice level of the image signal for this period is a pedestal level and is constant. Therefore, in the embodiment, each of the change-over switches 27, 29 and 33 is switched onto the side b for the period of the horizontal front porch with respect to the image signal. Thus, the signal indicative of the pedestal level is transmitted from the pedestal level output circuit 30 to the television monitor 35 through the change-over switch 33. The signal indicative of the pedestal level from the pedestal level output circuit 30 is substituted for the image signal. Further, the sound signal is inputted to the sample-hold circuit 31 from the data register 26 through the change-over switch 27, the D/A converter 28 and the change-over switch 29.

Thus, the sound signal is sample and held by the sample-hold circuit 31. The operations of the change-over switches 27, 29 and 33 are associated with each other. Each of these change-over switches 27, 29 and 33 is switched onto the side of contact b when the voice data are converted to an analog signal by the D/A converter 28. Each of the change-over switches 27, 29 and 33 is switched onto the side of contact a when the image data are converted to an analog signal by the D/A converter 28.

Timings of the operations are shown in FIG. 2. As a result, the image and sound signals are converted to the analog signals by the single D/A converter 28, thereby reducing the cost of the electronic camera and making the camera compact. A sampling frequency of the sound signal in the sample-hold circuit 31 is set to a horizontal synchronization frequency such as 15.75 KHZ or 1/N times the holizontal synchronization frequency where N designates a positive integer (1,2,3, - - - ). The sound signal from the sample-hold circuit 31 is outputted through the low pass filter 32 and is amplified by the amplifier 36. The amplified signal is converted to a voice by an electric acoustic converter 37 composed of a speaker.

When a system for compressing image data in the image data compressor 21 is constructed by generally well known DPCM and ADCT systems, etc., it is possible to compress data about ¼ to ¹⁄₂₀ times. Further, it is possible to obtain a sound quality without any practical problem when a voice data compressing system of the voice data compressor 22 is constructed by an ADPCM system and data of the sound signal are compressed at a data transmission rate 32K bps.

It is not necessary to provide a battery for backup when IC memory 12 of a card type is constructed by an EEPROM. If the IC memory of the card type having a capacity about 20M bits is realized, it is possible to compress the image data of one picture constructed by 6M bits to ¹⁄₁₅ times (400K bits) these image data and record images of 50 pictures. Further, it is possible to perform a voice recording operation for a time 400K bits/32K bps=12.5 seconds if the voice is recorded by an amount of data of one picture.

The photographing and recording operations may be separately performed. Otherwise, the photographing and recording operations may be apparently performed simultaneously at a photographing time of the camera. A time required to compress and record the image data to the IC memory 12 of the card type is several ten m seconds to several hundred m seconds.

Accordingly, the photographing and recording opeartions are apparently performed simultaneously if the recording operation is performed just after the photographing operation. It is possible to independently perform the photographing and recording operations as mentioned above.

In reproducing the image and the voice, image data are first read out of the IC memory 12 of the card type and are expanded by the image data expander 24 through the interface 23. The expander data are then stored in the frame buffer 20. Thereafter, voice data are read out of the IC memory 12 of the card type such that a sound signal is outputted from the data register 26 through the change-over switch 27, the D/A converter 28, the change-over switch 29, the sample-hold circuit 31 and the low pass filter 32 at a timing of the horizontal front porch when an image signal is outputted from the frame buffer 20 to the television monitor 35. The read voice data are expanded by the voice data expander 25 through the interface 23 and are then stored in the data register 26. As mentioned above, the sampling frequency of the sound signal in the sample-hold circuit 31 is set to the horizontal synchronization frequency such as 15.75 KHZ or 1/N times this horizontal synchronization frequency where N designates a positive integer (1,2,3 - - - ). Accordingly, it is possible to sufficiently process the sound signal in real time through the IC memory 12 of the card type, the interface 23, the voice data expander 25 and the data register 26.

In the above embodiment, the television monitor 35, the amplifier 36 and the speaker 37 are not built-in the camera body 11, but these constructional elements may be built-in the camera body 11. In such a structure, a photographer can immediately view the photographed image by the television monitor 35 so that it is convenient for the photographer to use the camera. Further, it is also convenient for the photographer to immediately hear the recorded voice by the speaker 37.

Figure 3:
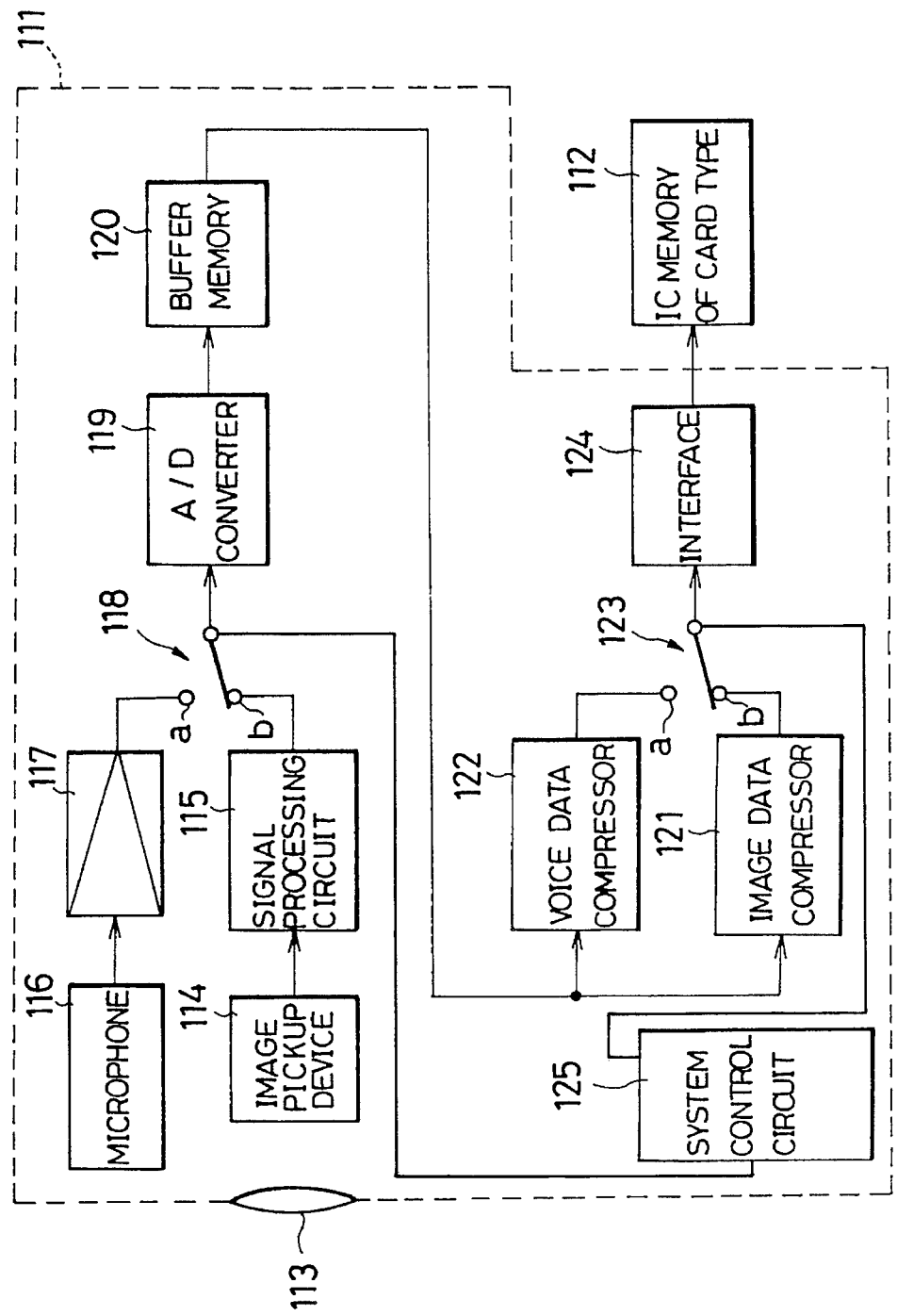
FIG. 3 is a block diagram showing an electronic still camera.

FIG. 3 shows an electronic still camera. The electronic still camera is constructed by a body 111 and an IC memory 112 of a card type detachably attached to the camera body 111.

The camera body 11 has a lens 113, an image pickup device 114 constructed by an image pickup element, a signal processing circuit 115, a microphone 116, an amplifier 117, a change-over switch 118, an analog/digital (A/D) converter 119, a buffer memory 120, an image data compressor 121, a voice data compressor 122, a change-over switch 123, an interface 124, and a system control circuit 125. The system control circuit 125 controls the operations of the above constructional circuit elements in the camera body 111.

When a system for compressing image data in the image data compressor 121 is constructed by generally well-known DPCM and ADCT systems, etc., it is possible to compress data about ¼ to ¹⁄₂₀ times Further, it is possible to obtain a sound quality without any practical problem when a voice data compressing system of the voice data compressor 122 is constructed by ADPCM and ADM systems, etc., and the data of a sound signal are compressed at a data transmission rate 32K bps.

It is not necessary to dispose a battery when the IC memory 112 of a card type is constructed by an EEPROM. If the IC memory 112 of the card type having a capacity of 20M bits is realized, it is possible to compress the data of one image constructed by a 6M bits to ¹⁄₁₅ times (400K bits) these image data and record 50 still pictures. Further, it is possible to perform a voice recording operation for a time 400K bits/32K bps=12.5 seconds if a voice is recorded by an amount of data of one image.

When a photographed object of one picture is photographed and recorded to the memory as a still image, each of movable contacts of the change-over switch 118, 123 is switched onto the side of a fixed contact b. Thus, the photographed object of one still picture is focused and formed as an image by the lens 113. The image of the photographed object of one picture formed by this lens 113 is photoelectrically converted to an analog image signal by image pickup device 114. This analog image signal is converted by the signal processing circuit 115 to a signal generally used as a standard television signal. This signal is constructed by signals indicative of red, green and blue colors. Otherwise, this signal is constructed by a luminance signal and two chrominance signals, etc. The analog signal from the signal processing circuit 115 is converted to a digital signal by the A/D converter 119 through the change-over switch 118 and is temporarily stored to the buffer memory 120. The image data compressor 121 compresses data of the digital image stored to the buffer memory 120. The compressed image data from this image data compressor 121 are recorded to the IC memory 112 of a card type through the change-over switch 123 and the interface 124.

When a voice with respect to the photographed object is recorded to the memory by a user, each of the movable contacts of the change-over switches 118,123 is switched onto the side of a fixed contact a. Thus, the voice with respect to the still picture is converted to an analog electric signal by the microphone 116. The analog electric signal from this microphone 116 is amplified by the amplifier 117 and is converted to a digital signal by the A/D converter 119 through the change-over switch 118. The digital sound signal from the A/D converter 119 is temporarily stored in the buffer memory 120. Data of the digital sound signal stored in the buffer memory 120 are then compressed by the voice data compressor 122 and are stored in the IC memory 112 of the card type through the change-over switch 123 and the interface 124.

The photographing and recording operations may be separately performed. Otherwise, the photographing and recording operations may be apparaently performed simultaneously at a photographing time of the camera. A time required to compress and record image data to the IC memory 112 of the card type is several ten m seconds to several hundred m seconds. Accordingly, the photographing and recording operations are apparently performed simultaneously if the recording operation is performed just after the photographing operation. It is possible to independently perform the photographing and recording operations as mentioned above.

Figure 4:
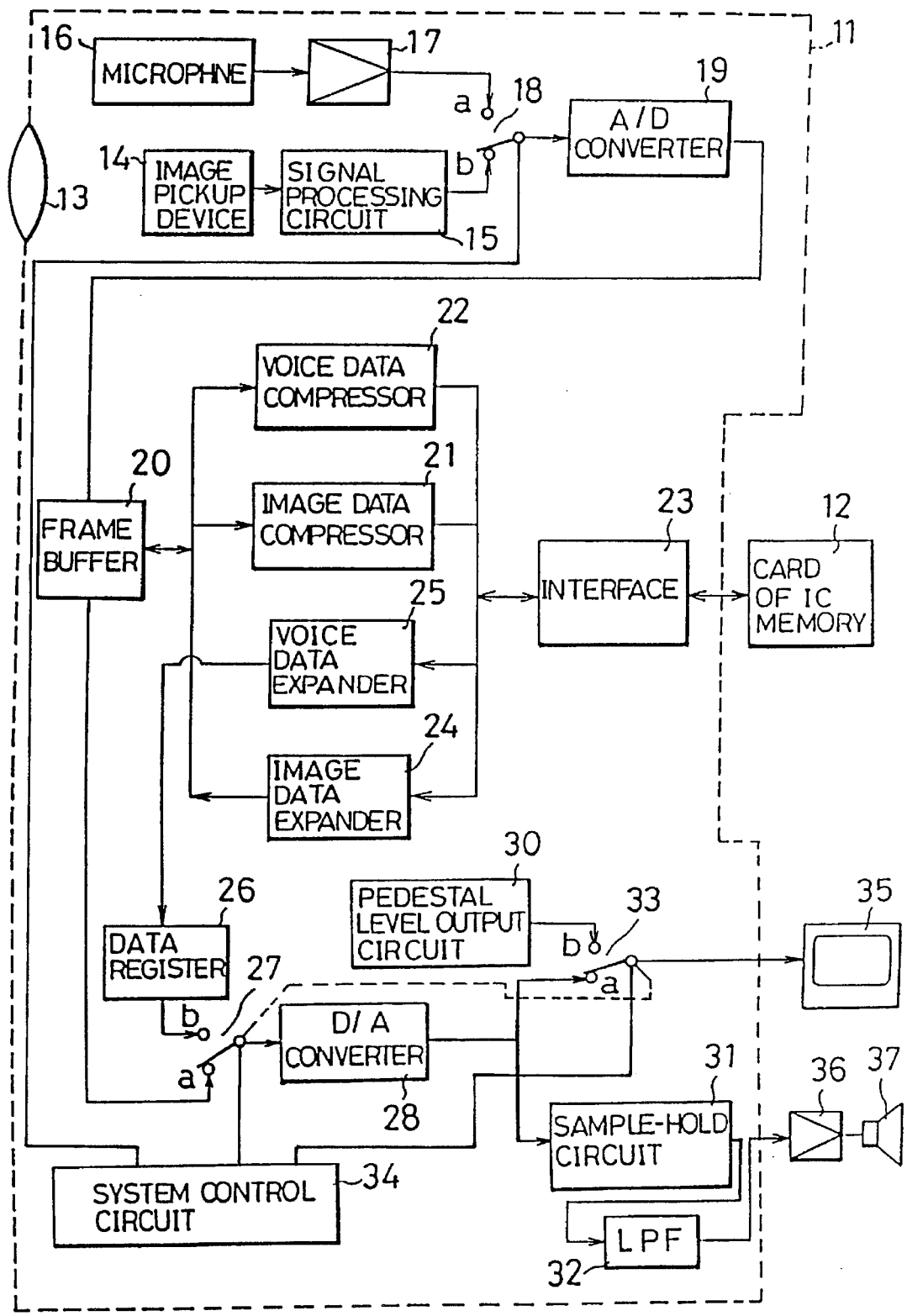
FIG. 4 is a block diagram showing an electronic camera in a second embodiment of the present invention.

FIG. 4 shows a second embodiment of the invention. In FIG.4, the change-over switch 29 is excluded, the D/A converter 28 is connected to sample-hold circuit 31 and to the side of contact a of the change-over switch 33 at an output thereof. Timings on the sample-hold of the sample-hold circuit 31 is set when the analog sound signals are inputted, the sample-hold circuit 31 itself has a function for selecting the analog sound signals. The other features of the second embodiment are the same as those of the first embodiment.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic camera for photographing and recording an image, and for recording and reproducing a voice, comprising:

an image converting means for converting image data of photographed images to digital image signals and for outputting the converted digital image signals;

a voice converting means for converting voices input thereto to digital sound signals and for outputting the converted digital sound signals;

an image data compressing and expanding means for compressing and storing the output digital image signals from said image converting means and for expanding and outputting the compressed and stored digital image signals;

a voice data compressing and expanding means for compressing and storing the digital sound signals output from said voice converting means and for expanding and outputting the compressed and stored digital sound signals;

a single digital/analog converter for converting the output digital image signals from said image data compressing and expanding means to analog image signals and for converting the output digital sound signals from said voice data compressing and expanding means to analog sound signals;

a sample-holding means for sampling and holding the converted analog sound signals from said single digital/analog converter and for supplying the sample-held analog sound signals to a sound signal output portion;

a pedestal level generating means for generating signals indicative of pedestal levels on the analog image signals;

a change-over switching means for connecting said voice data compressing and expanding means to said sample-holding means through said single digital/analog converter in order to supply the analog sound signals to said sample-holding means when said pedestal level generating means is supplying the signals indicative of pedestal levels to an image signal output portion of the electronic camera, and for connecting said image data compressing and expanding means to the image signal output portion through said single digital/analog converter in order to supply the analog image signals to the image signal output portion when said pedestal level generating means is not supplying the signals indicative of pedestal levels to the image signal output portion; and a system control means for controlling the operation of the electronic camera including an operation of the change-over switching means.

2. An electronic camera according to claim 1, wherein said sample-holding means has a low pass filter through which the sample-held analog sound signals are output.

3. An electronic camera according to claim 1, wherein said voice date compressing and expanding means includes a data register for temporarily holding the digital sound signals to supply the digital sound signals to said change-over switching means.

4. An electronic camera according to claim 1, wherein said image data compressing and expanding means includes a frame buffer for storing the digital image signals to supply the digital image signals to said change-over switching means.

5. An electronic camera according to claim 1, wherein said change-over switching means comprises a first switch for selecting signals from one of the expanded digital sound signals and the expanded digital image signals and for supplying the selected signals to the single digital/analog converter, and a second switch for selecting one of the single digital/analog converter and the pedestal level generating means and for supplying signals output from the selected signals to the image signal output portion.

* * * * *